Patented June 4, 1935

2,003,291

UNITED STATES PATENT OFFICE 2,003,291

RESINOUS COMPOSITION

Rowland Hill, Cheadle Hulme, England, assignor to Imperial Chemical Industries Limited, a corporation of Great Britain No Drawing. Application April 17, 1933, Serial No. 666,627. In Great Britain April 23, 1932

9 Claims. (Cl. 260—3)

The present invention relates to the manufacture of new artificial resinous compositions, readily soluble in varnish oils and compatible with nitrocellulose, and to the production therefrom of valuable coating compositions.

According to the invention the methyl, ethyl, β-hydroxyethyl, tertiary butyl, decyl, cyclohexl, phenyl, naphthyl or other ether of a monovalent alcohol or phenol is condensed with formaldehyde, paraformaldehyde or other compound containing a reactive methylene group in an acid medium.

According to a further feature of the invention the new artificial resinous compositions are combined with natural resins or with other synthetic resins.

Also according to a still further feature of the invention the new artificial resinous compositions and their combinations with natural resins or other synthetic resins are used for the preparation of moulding and adhesive compositions.

The invention also includes the production of valuable coating compositions by dissolving the new artificial resinous compositions or their said compositions in a drying or semi-drying oil, which may be raw or heat-bodied or air-blown or otherwise treated, preferably by the application of heat or by mixing them with nitrocellulose, e. g. in a suitable solvent.

It also includes the application of these coating compositions as finishes for metal and wood and also as coatings for leather, rubber and textiles.

In carrying the invention into practical effect according to the various features of the invention we may work as follows: In making the resin we may mix the ether and aldehyde, or other body containing a reactive methylene group and heat in an open or closed vessel according to the temperature it is necessary to attain. We attach particular importance to the resins made from methyl, ethyl and β-hydroxyethyl ether of 1:3:5-xylenol, especially that from the methyl ether. The acid used is preferably of a strongly acidic nature, for instance it may be hydrochloric, sulphuric or trichloroacetic acid. We may, however, use milder acids, for instance acetic acid, oxalic or citric acid, or an acid reacting substance for instance potassium hydrogen sulphate.

A solvent, for example, methylated spirits may be added to the interacting mixture, if desired, to facilitate solution of the xylenol ether.

In combination the new resinous compositions with natural resins, we may use colophony, run copal, and in combining with other synthetic resins I may use, phenol-formaldehyde, and polyhydric alcohol-polybasic acid including the so-called alkyd resins. In either case combination may be effected by fusing together at a suitable temperature, for example, 100–200° C., or it may be effected by dissolving the resins to be combined in a suitable solvent or solvent mixture and removing the solvent.

In making adhesive compositions I select preferably the products of soft or balsam-like nature, made by condensing suitable starting materials such as for instance the n-propyl ether among ethers, and by using suitable condensing conditions, such as lower proportions of formaldehyde.

In order to further illustrate my invention the following examples are given, the parts being by weight.

*Example 1.*—45 parts of 1:3:5-xylenol methyl ether, 45 parts of 41% aqueous formaldehyde and 2 parts of hydrochloric acid (36° Tw.) are stirred and boiled together in a vessel fitted with a reflux condenser for 6 hours. The mixture having settled, the aqueous layer is poured off and the condensation product is heated under diminished pressure, the temperature being finally taken up to 120° C. to remove volatile matter, chiefly water.

The so-obtained resinous composition is transparent, straw coloured and hard, and dissolved freely in the usual varnish oils.

*Example 2.*—30 parts of the resinous composition obtained by the method of Example 1 and 60 parts of tung oil are heated together. The resin dissolves and a clear blend is formed at 120° C. The temperature is taken up to about 220° C. at which it is kept until the blend strings lightly from a rod when withdrawn sharply. After cooling to about 200° C. 90 parts mineral spirits and 2 parts cobalt linoleate (containing 3% cobalt as metal) are added with stirring.

The so-obtained varnish is golden orange in colour. It dries rapidly to form a hard tough colourless film possessing a high lustre.

*Example 3.*—67.5 parts of *m*-xylenol methyl ether, 67 parts of 41% aqueous formaldehyde and 2 parts of hydrochloric acid (36° Tw.) are heated together in an autoclave at 150° C. for 4 hours with stirring.

The resinous composition is separated as described in Example 1. It is hard, pale brown and transparent.

*Example 4.*—The resinous composition obtained by the process of Example 3 is readily soluble in linseed, tung, perilla, soya bean oils, and stand and boiled oils. It also dissolves readily in acetone, diacetone alcohol, benzene, xylene, ethyl and butyl acetates, ethyl lactate, ethylene glycol monoethyl ether, and cyclohexanol. It is soluble in hot butyl alcohol, turpentine and mineral spirits, but separates from the solution on cooling. It is insoluble in methylated spirits, cold or hot. It forms clear films with nitrocellulose in all proportions.

Dependent upon these properties it can be made up into coating compositions for instance by methods analogous to Example 2. The resin has a melting-point of 102° C. By heating it to 210° C. for 1 hour, the melting point is raised to 150° C. The heat treated resin has the same solubility in e. g., drying-oil as the original resin.

Example 5.—The resinous composition obtained by the process of Example 2, is dissolved in a solvent or solvent mixture such as listed in Example 3, the solution mixed in suitable proportion with a solution of nitrocellulose in an ester solvent or other suitable solvent. Plasticisers or pigments may also be incorporated in the mixture. Articles may be coated with such compositions by brushing, spraying or dipping.

Example 6.—30 parts of 1:3:5-xylenol ethyl ether, 32.4 parts of 37% aqueous formaldehyde and 1 part of hydrochloric acid (36%) are heated at 96°–98° C. for 8 hours. The thick creamy emulsion is then dehydrated under reduced pressure, the temperature being finally taken up to 100° C. The resin so obtained is amber coloured, and is fairly hard. It is softened somewhat by the heat of the hand. It dissolves readily in linseed and tung oils, and in divers organic solvents.

Example 7.—20 parts of the resin obtained in Example 6 are heated with 50 parts of raw tung oil. The resin dissolves to form an amber coloured varnish at about 70°–80° C. The blend is heated for 20 to 25 minutes at 230° C. and is then thinned with mineral spirits to form a varnish having a viscosity 3–3½ poises/20° C. at a solids content of 66%. 0.1 part of cobalt (in the form of cobalt linoleate) is added for every 100 parts of oil. The resulting varnish is brown in colour; it dries rapidly and forms a hard set coating in one hour.

Example 8.—1:3:5-xylenol-β-hydroxyethyl ether, B. P. 158–161° C., at 25 mm. is obtained by boiling together 1:3:5-xylenol, ethylenechlorohydrin and aqueous caustic soda.

55 parts of 1:3:5-xylenol-β-hydroxyethyl ether, 16 parts of aqueous formaldehyde (40%) and 1.7 parts of aqueous hydrochloric acid (35%) are boiled together under a reflux condenser for 2 hours. The formaldehyde is completely taken up. The resin obtained is dehydrated by heating it under reduced pressure, the temperature being finally taken up to 110° C. The cooled mass is hard and pale brown in colour. It is readily soluble in varnish oils, and dissolves in the common organic solvents with the exception of methylated spirits.

Example 9.—45 parts of methyl ether of 1:3:5-xylenol containing 0.5% of dissolved hydrogen chloride, and 19 parts of paraformaldehyde are heated together in a closed vessel at about 120° C. A resinous composition of similar type to that of Example 1 is obtained.

Example 10.—This is similar to Example 1 but tertiary butyl alcohol is heated with 1:3:5-xylenol.

Example 11.—226 parts of the m-xylenol ether of 1:3:5-xylenol, 113 parts of 40% formaldehyde solution and 5 parts of 36% hydrochloric acid are refluxed together for about 10 hours. The resin is isolated as previously described.

Example 12.—This is similar to Example 1, but instead of using the methyl ether of 1:3:5-xylenol the methyl ether of other phenols may be employed and instead of formaldehyde other aldehydes for instance paraformaldehyde.

Example 13.—Similarly tertiary butyl, decyl, phenyl, or naphthyl ethers of 1:3:5-xylenol or other phenols may be heated together in an acid medium.

Example 14.—Combination of the new resinous compositions with a valuable resin is illustrated by the following. Equal parts by weight of colophony and the resin made according to Example 1, are fused together at 200° C. for 5 minutes. A hard transparent pale yellow resin is obtained. It melts 30° higher than colophony. By longer heating, for example, 30 minutes resins of still higher melting point are obtained. These combined resins are soluble in drying or semi-drying oils, raw or treated and in a wide range of organic solvents and are compatible with nitrocellulose in all proportions.

I claim:

1. A process for the manufacture of new oil-soluble artificial resinous compositions which comprises condensing in an acid medium, a compound selected from the group consisting of the methyl, ethyl, and β-hydroxyethyl ethers of 1:3:5-xylenol and a compound containing a reactive methylene group.

2. A process for the manufacture of new oil-soluble artificial resinous compositions which comprises condensing in an acid medium a compound selected from the group consisting of the methyl, ethyl, and β-hydroxyethyl ethers of 1:3:5-xylenol and a compound of the group consisting of formaldehyde and paraformaldehyde.

3. A process for the manufacture of new oil-soluble artificial resinous compositions which comprises condensing the methyl ether of 1:3:5-xylenol with formaldehyde.

4. A process which comprises mixing approximately 45 parts of 1:3:5-xylenol methyl ether, 45 parts of 41% aqueous formaldehyde and 2 parts of hydrochloric acid, boiling the mixture approximately six hours and recovering the resin formed.

5. A process for the manufacture of a coating composition which comprises condensing in an acid medium a compound selected from the group consisting of the methyl, ethyl, and β-hydroxyethyl ethers of 1:3:5-xylenol and a compound containing a reactive methylene group, dissolving the resin so obtained in a drying oil.

6. A resinous composition obtainable by condensing in an acid medium, a compound selected from the group consisting of the methyl, ethyl, and β-hydroxyethyl ethers of 1:3:5-xylenol and a compound containing a reactive methylene group.

7. A resinous composition obtainable by condensing in an acid medium a compound selected from the group consisting of the methyl, ethyl, and β-hydroxyethyl ethers of 1:3:5-xylenol and a compound of the group consisting of formaldehyde and paraformaldehyde.

8. A resinous composition obtainable by condensing the methyl ether of 1:3:5-xylenol with formaldehyde.

9. A coating composition comprising a resinous composition obtainable by condensing in an acid medium, a compound selected from the group consisting of the methyl, ethyl, and β-hydroxyethyl ethers of 1:3:5-xylenol and a compound containing a reactive methylene group.

ROWLAND HILL.